Patented Apr. 8, 1930

1,753,658

UNITED STATES PATENT OFFICE

GERD KOCHENDOERFER, OF FRANKFORT-ON-THE-MAIN, GERMANY, ASSIGNOR TO DEUTSCHE GOLD & SILBER SCHEIDEANSTALT VORMALS ROESSLER, OF FRANKFORT-ON-THE-MAIN, GERMANY, A CORPORATION

PROCESS FOR THE PREPARATION OF SULPHUR COMPOUNDS OF PYRIDINE

No Drawing. Application filed November 29, 1927, Serial No. 236,593, and in Germany December 3, 1926.

The purpose of the present invention is to introduce sulphur into the pyridine nucleus. I have now found that sulphur can be introduced into the pyridine nucleus by the reaction of a pyridine compound containing a reactive halogen atom, either attached directly to the nucleus or indirectly by a diazo group, with the group $-SR$, wherein R is any element or group of elements.

Compounds which may be used for supplying the sulphur for this reaction are those of the general formula $M_2S$, or $M_2S_2$, or $MSR$, wherein M signifies a monovalent metal and R any other element or group of elements such as an organic or inorganic radical.

The following examples will serve to illustrate my invention:

Examples (1) 8 grs. of $\alpha$-chloro-$\beta'$-cyano-pyridine were boiled in a reflux condenser with 16 grs. of KSH— in 80 cc. of alcohol for 5 hrs. After evaporating the solvent a yellow product containing free sulphur was obtained. By dissolving this product in NaOH and recrystallizing with HCl and finally crystallizing out of alcohol, $\alpha$-mercapto-$\beta'$-cyano-pyridine,

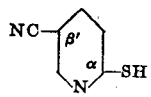

was obtained in the form of yellow crystals at about 245° C.

The cyano group can be saponified by acids as well as alkalis and $\alpha$-mercapto-pyridine-$\beta'$-carbonic acid is obtained in the form of yellowish-green crystals which do not melt even at 270° C.

(2) 120 grs. of potassium hydrogen sulfide were added to a suspension of 96 grs. of $\alpha$-chloro-$\beta'$-nitro-pyridine in 800 cc. of methanol. A vigorous reaction began after a short time even in the cold solution and it was necessary to regulate the reaction by means of cooling. At the end of the reaction the materials were heated for one quarter of an hour on the water bath, filtered by suction from the KCl and methyl alcohol distilled off. The residue was dissolved in a little water and precipitated with HCl. The raw product was then boiled with about 2 liters of 50% methanol. 41 grs. of $\alpha$-mercapto-$\beta'$-nitro-pyridine.

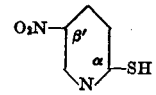

crystallized out of the filtrate, melting point 171 to 172° C. with decomposition. The material remaining from the last crystallization was crystallized out of xylol and proved to be the corresponding disulfide. The yield of the latter was 14 grs. melting at 156° C. Reduction of the $\alpha$-mercapto-$\beta'$-nitro-pyridine in the usual manner, for example, with glacial acetic acid and iron powder, resulted in the corresponding amino compound which was easily soluble in NaOH and HCl and decomposed at about 245° C.

(3) 120 grs. of potassium hydrogen sulfide were added to a suspension of 122 g. $\alpha$-bromo-$\beta'$-nitro-pyridine in 1100 cc. of methanol. A rigorous reaction began after a short time even in the cold solution and it was necessary to moderate the reaction by means of cooling. At the end of the reaction the materials were filtered by suction from the KCl and methanol distilled off. The residue was dissolved in water and precipitated with HCl. The raw product was boiled with about 2 liters of 50% methanol. 45 grs. of $\alpha$-mercapto-$\beta'$-nitro-pyridine,

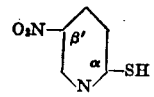

crystallized out of the filtrate, melting point 171 to 172° C. with decomposition. The material remaining from the last crystallization was crystallized out of xylol and proved to be the corresponding disulfide. The yield of the latter was 12 grs. melting at 156° C.

(4) 3 grs. of α-chloro-β'-iodo-pyridine, 10 cc. of alcohol, and 5 grs. of KSH were heated in a tube for 8 hrs. at 130 to 140° C. 1.5 grs. of pure α-mercapto-β'-iodo-pyridine,

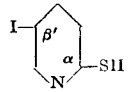

were obtained having a melting point of 216° C. by crystallization out of glacial acetic acid or alcohol. The yellow product was colorless in dilute NaOH.

(5) Equimolecular quantities of diazotized α-oxy-β'-amino-pyridine and sodium ethyl xanthogenate were brought together and gently warmed until the evolution of nitrogen ceased. The ethyl xanthogen pyridyl ester thus obtained does not need to be isolated but can be immediately saponified to the α-oxy-β'-pyridine-mercaptan,

Instead of reacting the diazo compound with a xanthogenate one can bring it into reaction with a metal sulfide or hydrogen sulfide.

What I claim is:

1. A process for the preparation of a pyridyl sulfide comprising reacting a compound containing the group M—S—, wherein M is a monovalent metal, with a derivative of pyridine containing a halogen atom so as to react said metal with said halogen atom to form the metal halide and to attach the sulphur directly to the pyridine nucleus.

2. A process for the preparation of a pyridyl sulfide comprising reacting a compound containing the group M—S—, wherein M is a monovalent metal, with a derivative of pyridine containing a nuclear chlorine atom so as to react said metal with said chlorine atom to form the metal chloride and to attach the sulphur directly to the pyridine nucleus.

3. A process for the preparation of a pyridyl sulfide comprising reacting a compound containing the group M—S—, wherein M is an alkali metal, with a derivative of pyridine containing a nuclear chlorine atom so as to react the alkali metal with the chlorine atom to form alkali chloride and to attach the sulphur directly to the pyridine nucleus.

4. A process for the preparation of a pyridyl sulfide comprising reacting a compound containing the group M—S—, wherein M is a potassium atom, with a derivative of pyridine containing a nuclear chlorine atom so as to react the potassium atom with the chlorine atom to form potassium chloride and to attach the sulphur directly to the pyridine nucleus.

5. A process for the preparation of a pyridyl sulfide comprising reacting a compound containing the group M—S—, wherein M is a potassium atom, with α-chloro-β'-cyano-pyridine so as to react the potassium atom with the chlorine atom to form potassium chloride and to attach the sulphur directly to the pyridine nucleus.

6. A process for the preparation of α-mercapto-β'-cyano-pyridine comprising reacting potassium hydrogen sulfide with α-chloro-β'-cyano-pyridine.

Signed at Frankfort-on-the-Main, Germany, this 7th day of November, A. D. 1927.

GERD KOCHENDOERFER.